United States Patent [19]

Romi

[11] Patent Number: 4,495,843
[45] Date of Patent: Jan. 29, 1985

[54] AUTOMATIC UNCOUPLING DEVICE

[75] Inventor: Romeu Romi, Sao Paulo, Brazil

[73] Assignee: Industrias Romi S/A, Sao Paulo, Brazil

[21] Appl. No.: 401,325

[22] Filed: Jul. 23, 1982

[51] Int. Cl.³ ............................................. B23B 21/00
[52] U.S. Cl. .......................................... 82/23; 82/22
[58] Field of Search ................ 82/22, 23; 74/424.8 R, 74/424.8 A

[56] References Cited

U.S. PATENT DOCUMENTS

| | | | |
|---|---|---|---|
| 945,387 | 1/1910 | Hanson | 82/22 |
| 2,903,933 | 9/1959 | Mackenzie | 82/23 |

FOREIGN PATENT DOCUMENTS

| | | | |
|---|---|---|---|
| 92722 | 10/1896 | Fed. Rep. of Germany | 82/22 |
| 82819 | 10/1919 | Switzerland | 82/23 |
| 740013 | 11/1955 | United Kingdom | 82/23 |

*Primary Examiner*—Francis S. Husar
*Assistant Examiner*—William E. Terrell
*Attorney, Agent, or Firm*—Michael J. Striker

[57] ABSTRACT

An automatic uncoupling device for opening half-nuts for cutting threads, which half-nuts are provided on engine lathes or any other machine tools, is installed on the body of the apron of the lathe. The device includes a control lever mounted on a shaft operatively connected to the half-nuts and a disc provided with a radially extended arm. A hollow cartridge mounted in the apron has a pin slidably inserted therein. One end of the pin is in constant contact with the arm of the disc. The device further includes a trigger arranged in contact with the opposite end of the pin. A cylindrical member with the limiting pins is shiftably mounted in the apron and adapted, upon its shiftable movement, to actuate the trigger through an elongated element. When, upon advancing movement of the apron towards a stop element provided on the lathe, the limiting pins of the cylindrical member abut against the stop element the cylindrical member is displaced and actuates the trigger, the pin in the cartridge and the shaft thus uncoupling the half-nuts.

19 Claims, 5 Drawing Figures

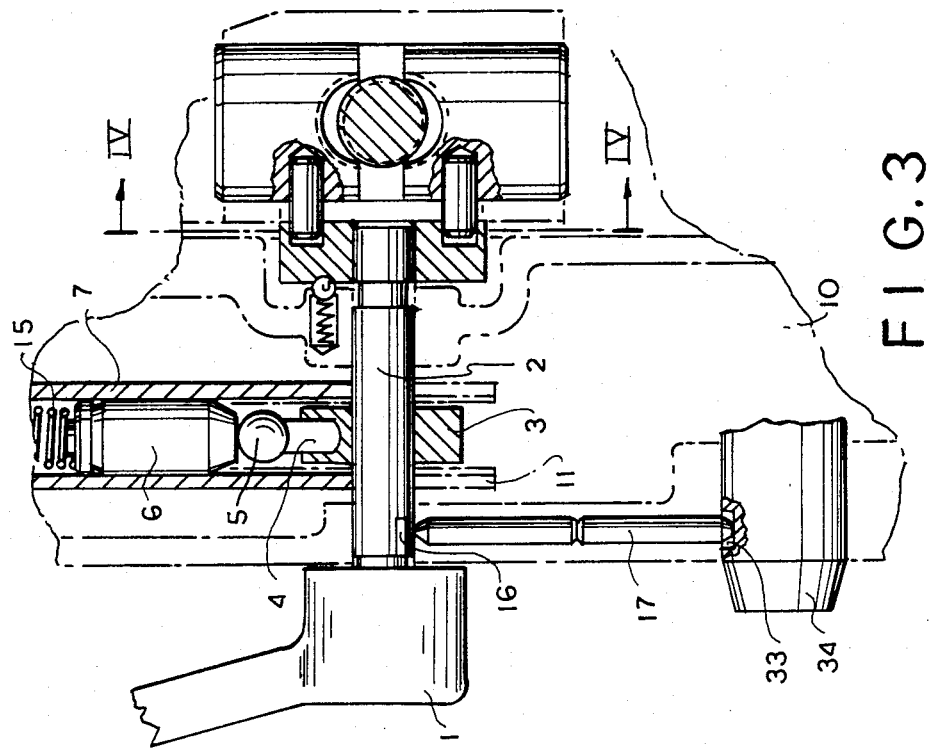

AUTOMATIC UNCOUPLING DEVICE

BACKGROUND OF THE INVENTION

The invention relates to devices for cutting threads on lathes or any other machine tools. More particularly, the invention relates to an automatic uncoupling device for opening half-nuts provided in a conventional mechanism for cutting threads.

In known devices of the type under discussion thread cutting on machine tools is performed by a combination of rotary motion of a workpiece and longitudinal motion of a carriage supporting a tool. In the apron of the lathe a mechanism comprising one or two half-nuts is incorporated. The half-nuts are engaged or disengaged manually by an operator. Repeated thread cutting usually requires close attention from the operator, particularly when threading is close to a shoulder.

SUMMARY OF THE INVENTION

It is an object of the invention to provide an automatic uncoupling device for opening half-nuts for cutting threads.

Another object of the invention is to provide an uncoupling device on the apron of the machine tool, which device exerts automatic action of instantly opening the half-nuts. That action occurs at the end of each pass of the thread being cut and stops the tool holder instantaneously and without shock.

It is a further object of the invention to provide a device suitable for the apron of lathes and capable for automatically and instantly interrupting the cutting of a thread, particularly threads against the shoulder.

Still another object of the invention is to provide an automatic uncoupling device for a standard mechanism for cutting threads on lathes, which device is self-operated (without interference from the operator), which device protects the operator against physical and mental fatigue which usually occurs when repeated uncoupling operation is manual.

Yet another object of the invention is to provide a device which protects the machine tool against possible collision accidents since the operation of the uncoupling device does not depend upon the operator's action.

The device for automatic disengagement of half-nuts of this invention should not be confused with other types of automatic uncoupling mechanisms also suitable for lathes. While the latter are normally used to stop longitudinal feeds during turning operation, the device of this invention is operative for stopping apron motion when cutting threads.

These and other objects of the invention are attained by an automatic uncoupling device for opening half-nuts for cutting threads mounted on a machine having an apron supporting the half-nuts and a stop means, the device being mounted to the apron and comprising a control lever supported on a turnable shaft operatively connected to the half-nuts; a disc rigidly supported on said turnable shaft and having an arm radially outwardly extending therefrom; a hollow cartridge mounted in the machine apron; a movable pin in said cartridge and having one end arranged in constant contact with said arm; a trigger element being in constant contact with an opposite end of said pin; and displaceable means operatively connected to said trigger element, said displaceable means upon advancing movement of the apron toward said stop means abut against the stop means and are displaced to actuate said trigger element, said pin, said arm and said shaft to uncouple the half-nuts.

The arm may be terminated with a ball, said one end of the pin being tapered, the ball being in constant contact with said one tapered end.

In accordance with another feature of the invention the pin is biased by a helical spring arranged in the cartridge and operative to ensure the constant contact of said one tapered end of the pin with the ball.

The pin at its opposite end may have a tapered surface, the trigger element being provided with a wedge end which is in constant contact with said tapered surface.

According to further feature of the invention the trigger element is biased with a spring permanently forcing said trigger element against the pin and ensuring the constant contact of said wedge end with said tapered surface.

The cartridge may have an elongated slot through which the arm and the ball extend into the cartridge.

The displaceable means may include a drum axially shiftable in a hole formed in the apron. The drum may have a collar formed with a circumferential tapered chamber.

The device may further include an elongated member operatively interconnected between the trigger element and the drum. The elongated member may have a wedged end engageable with said tapered chamber and an opposite end engageable with the L-shaped trigger element, whereby when the shiftable drum is displaced upon the contact thereof with the stop means it displaces the elongated member which in turn displaces the trigger element connected to said pin.

The trigger element and the elongated member may be mounted on a supporting piece secured to the apron.

The axially shiftable drum may have an axial hole, a springly biased pin being inserted into said axial hole, said springly biased pin having a terminal extended outwardly of the drum and provided with a conical end resting on the end of the aforementioned hole formed in the apron. The drum may be further formed with at least one threaded hole receiving at least one limiting threaded pin extended outwardly of said drum, said pin abutting against the stopping means to actuate the uncoupling device by causing the shiftable movement of the drum.

The device may further comprise means for aligning the position of the drum in the hole formed in the apron. The aligning means may include at least one spring-loaded ball, said drum being formed with at least one axially extended recess, said ball being radially extended into said recess.

The uncoupling device according to the invention may include a longitudinal-feed control lever on the apron and means for preventing simultaneous actuating of said longitudinal-feed control lever with said control lever for coupling the half-nuts.

Those preventing means may include an elongated pin provided with two opposite tapered ends, the shaft being formed with a recess engageable with one tapered end of the elongated pin, and said longitudinal-feed control lever being formed with a cavity engageable with another tapered end of said elongated pin, said one tapered end being out of register with said recess when said another tapered end is in register with said cavity.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 3 is a sectional view along line III—III of FIG. 2;

FIG. 4 is a sectional view along line IV—IV of FIG. 3; and

DETAILED DESCRIPTION OF THE PREFERRED EMBODIMENTS

Figure 1:
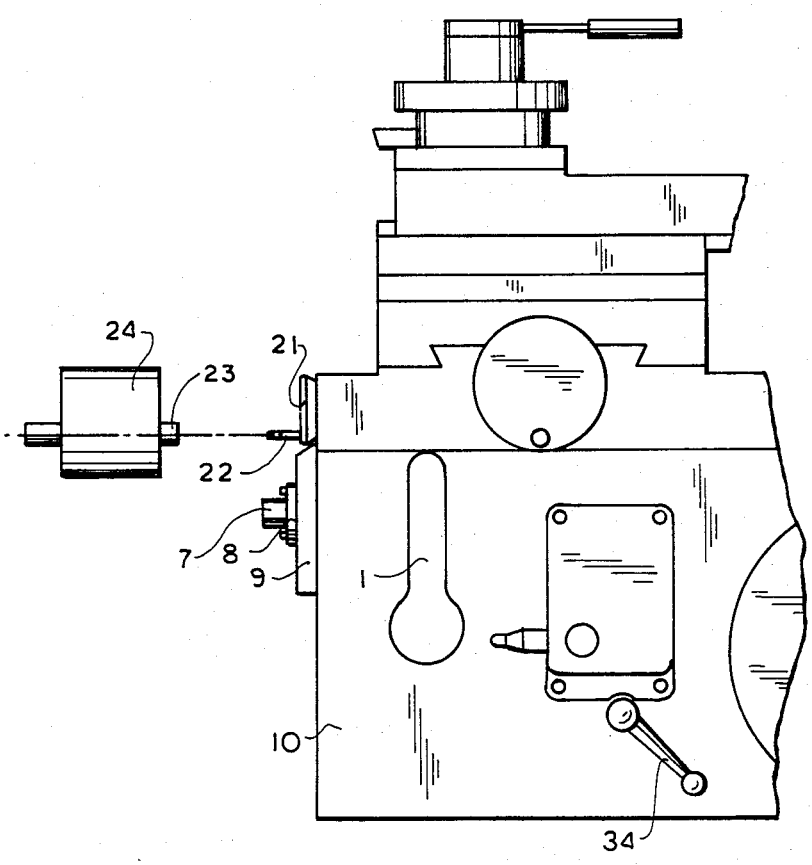
FIG. 1 is a partial front view of a lathe carriage provided with an uncoupling device for opening half-nuts for cutting threads according to the invention.
Figure 2:
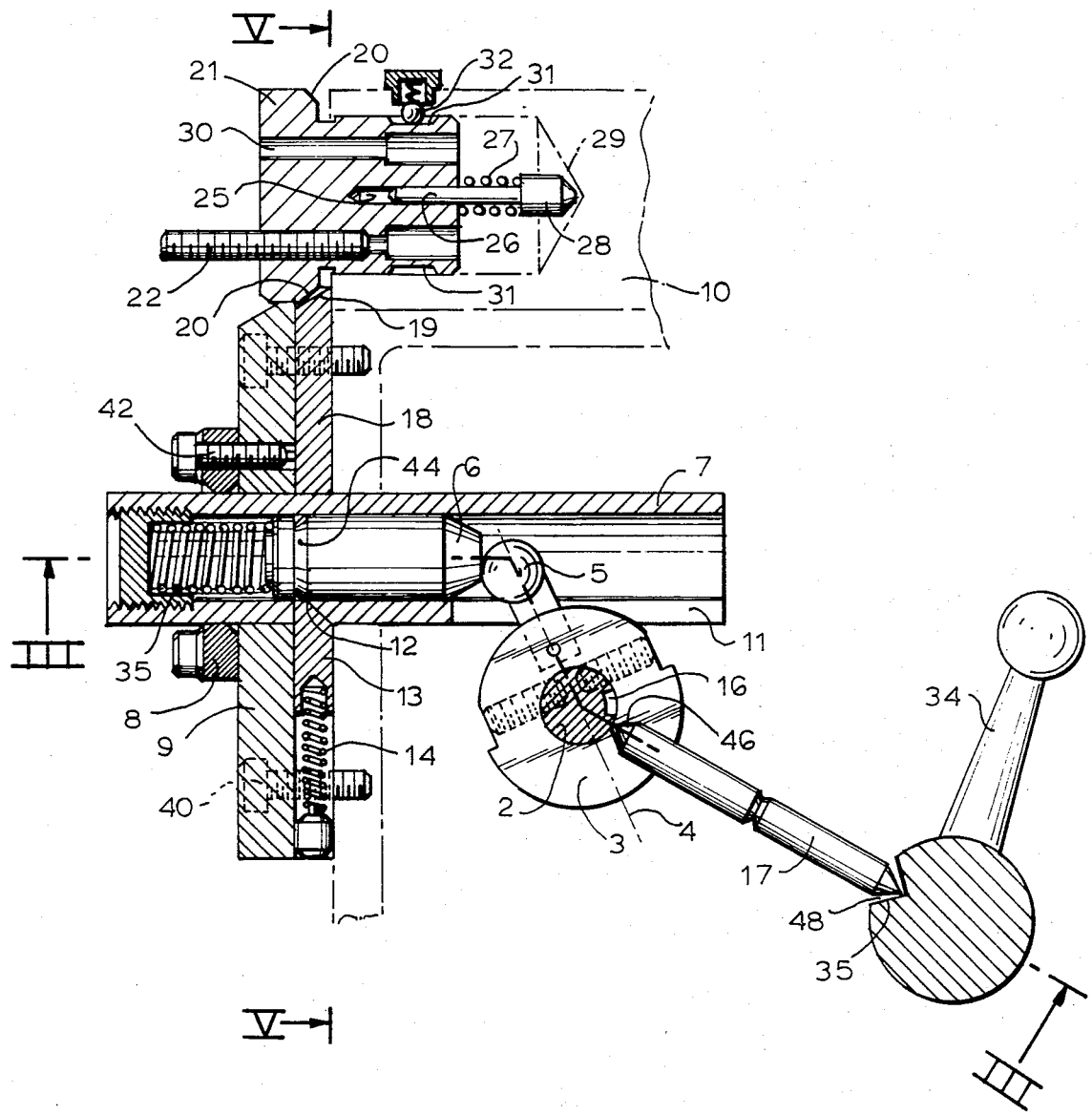
FIG. 2 is a sectional view through the uncoupling device according to the invention.

Referring to the drawings, and first to FIGS. 1-3, it will be seen that reference numeral 10 denotes an apron of the lathe. Apron 10 is illustrated in FIG. 2 by dotted lines. The automatic uncoupling device of the invention includes a control lever 1 mounted on a transverse shaft 2 on which disc or any suitable cylindrical piece 3 is mounted. Disc 3 is coupled with a radially extended arm 4 which is terminated with a ball 5. It will be understood that arm 4 may be connected to disc 3 by a pin or any other suitable conventional means. Ball 5 in turn may be integral with arm 4 or secured thereto by any suitable means. A cartridge 7 located inside the apron 10 is formed as a hollow cylindrical element having at its lower end an axial slot 11 which enables free passage of arm 4 with ball 5. A pin 6 is positioned in the hollow cartridge 7 and is provided with a tapered end with which ball 5 is in permanent contact. This contact is ensured by a helical compression spring 15. Cartridge 7 is held in the apron by means of a substantially rectangular piece 9 and flange 8 which are secured to the apron, for example by bolts 40. Flange 8 is held to piece 9 by screws 42. The cartridge 7 and flange 8 and piece 9 constitute one assembly fixed to the lateral side of the apron.

Figure 5:
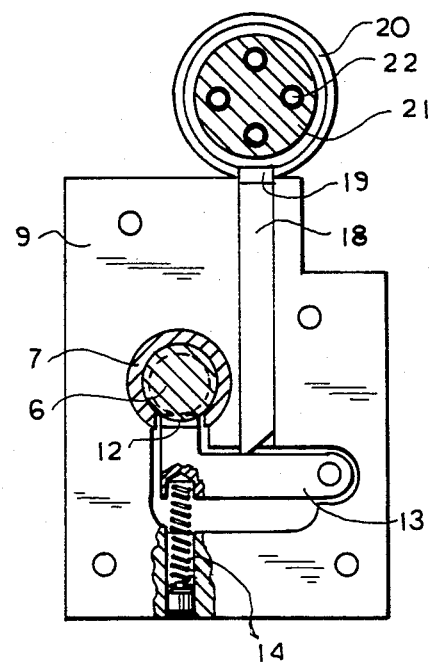
FIG. 5 is a sectional view along line V—V of FIG. 2.

Pin 6 is formed with a circular groove 44 near its end opposite to the aforementioned tapered end, this groove forming a circular tapered surface on the pin 6. An L-shaped trigger 13 clearly shown in FIG. 5 is mounted between the surface of the apron and piece 9. Trigger 13 has a wedge end 12 being in contact with the tapered surface of the pin 6 formed by groove 44. Pin 6 when pressed becomes triggered in that position by wedge end 12 of trigger 13 which in turn is always forced by a spring 14 against pin 6.

Shaft 2 is provided with a recess 16 clearly shown in FIGS. 2 and 3. A pin 17 has one tapered end 46 which engageably-releasable fits in recess 16. The opposite tapered end 48 of pin 17 is engaged within a cavity 33 of a longitudinal-feed control lever 34 provided on the lathe apron.

As seen in FIGS. 2 and 5 an elongated member 18 of a square-shaped cross-section and having a wedge end 19 is also mounted to piece 9. Wedge end 19 is maintained in permanent contact with a circular chamfer 20 formed on the collar of an axially shiftable cylindrical member or drum 21. Drum 21 may be angularly positioned so that a pin 22 outwardly extended therefrom will be in alignment with a pin 23 of stop 24 provided on the lathe and seen in FIG. 1.

Conventional half-nuts, for opening of which the herein described device is proposed, can be seen in FIGS. 3 and 4.

Referring back to FIGS. 2 and 5 it will be seen that drum 21 has an axial hole 25 in which pin 26 forced by a spring 27 is slideably inserted. Pin 26 has a terminal 28 with a conical end which rests against the end of a hole 29 drilled in the apron body. It is understood that drum 21 can be shifted along the hole 29. Drum 21 is further provided with a number of threaded holes 30 in which adjustable limiting threaded pins 22 are fitted. Only one pin 22 is shown in FIG. 2. When apron 10 is moved to the left towards the stop 24 the limiting pin 22 abuts against pin 23 of stop 24 thereby causing drum 21 to retract. This retraction of drum 21 will actuate elongated member 18 via its wedge end 19. The opposite end of the elongated member 18 (FIG. 5) will actuate trigger 13 causing instantaneous release of pin 6 through wedge end 12 contacting the left tapered end of pin 6.

Pin 6 will in turn actuate disc 3 and shaft 2 which will lead to uncoupling of the half nuts and, consequently, to the instantaneous stop of the tool holder. Drum 21 (FIG. 2) is further provided with a number of recesses 31 formed at the periphery thereof. Spring-loaded balls 32 fit in the respective recesses 31 to assure perfect alignment between the limiting pins 22 and pins 23 of stop 24.

When disc 3 is rotated upon descending of arm 4 shaft 2 rotates so that the tapered end 46 of pin 17 previously engaged in the recess 16 is expelled therefrom by the angular movement of shaft 2 causing the opposite end 48 of pin 17 to engage in the cavity 33 preventing in such a position the angular movement of the longitudinal-feed control lever 34. Due to the above-described design of the uncoupling device it is impossible to have both lever 1 for thread cutting and lever 34 for longitudinal-feed of the tool actuated at the same time. It is clearly understood that only one of the levers can be actuated at a time.

It will be understood that each of the elements described above, or two or more together, may also find a useful application in other types of uncoupling devices differing from the types described above.

While the invention has been illustrated and described as embodied in an uncoupling device, it is not intended to be limited to the details shown, since various modifications and structural changes may be made without departing in any way from the spirit of the present invention.

Without further analysis, the foregoing will so fully reveal the gist of the present invention that others can by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. An automatic uncoupling device for opening half-nuts for cutting threads mounted on a machine having an apron supporting the half-nuts and a stop means, the device being mounted in the apron and comprising a control lever supported on a turnable shaft having means thereon operatively connecting said shaft to said half-nuts; a disc rigidly supported on said turnable shaft and having an arm radially outwardly extending therefrom; said arm having a free end and including a ball at said free end rigidly connected to the arm; a hollow cartridge mounted in the machine apron; a movable pin in said cartridge and having one end engaged with said ball and an opposite end, said one end being tapered, first spring means urging said pin towards said ball and ensuring a permanent contact of said tapered end with said ball, a trigger element having a portion aligned with said opposite end so as to be engageable with said opposite end; second spring means biasing said trigger element towards said opposite end; and displaceable means operatively connected to said trigger element and operated when upon an advancing movement of the apron towards the stop means an element of the displaceable means abuts against the stop means and is displaced to cause another element thereof to move said trigger element against a force of said second spring means to release the trigger element from engagement with said opposite end of said pin whereby said first spring means urge said pin and said ball to move within said cartridge to cause the rotation of said arm, said disc and said turnable shaft therewith to uncouple the half-nuts.

2. The device of claim 1, wherein said pin at said opposite end has a tapered surface, said trigger element being provided with a wedged end which is engageable with said tapered surface.

3. The device of claim 2, wherein said second spring means is a spring biasing said trigger element towards said pin and ensuring the contact of said wedged end with said tapered surface when said trigger is engaged with said opposite end.

4. The device of claim 2, wherein said trigger element is L-shaped.

5. The device of claim 1, wherein said cartridge has an elongated slot through which said arm and said ball extend into the cartridge.

6. The device of claim 1, wherein said displaceable means include a drum axially shiftable in a hole formed in the apron.

7. The device of claim 6, wherein said drum has a collar formed with a circumferential tapered chamfer.

8. The device of claim 7, further including an elongated member operatively interconnected between said trigger element and said drum.

9. The device of claim 8, wherein said elongated member has a wedged end engageable with said tapered chamber and an opposite end engageable with said trigger element whereby when said shiftable drum is displaced upon the contact thereof with said stop means it displaces the elongated member which in turn displaces the trigger element to disengage the latter from said pin.

10. The device of claim 9, wherein said elongated member has a square-shaped cross-section.

11. The device of claim 9, wherein said trigger element and said elongated member are mounted on a supporting piece secured to the apron.

12. The device of claim 11, wherein said axially shiftable drum has an axial hole and includes a spring biased pin inserted into said axial hole, said spring biased pin having a terminal extended outwardly of the drum and provided with a conical end resting on the end of the aforementioned hole formed in the apron.

13. The device of claim 12, said drum being formed with at least one threaded hole receiving at least one limiting threaded pin extended outwardly of said drum, said limiting pin abutting against the stop means to actuate the uncoupling device by causing the shiftable movement of said drum.

14. The device of claim 13, further including means for aligning the position of said drum in said hole formed in the apron.

15. The device of claim 14, wherein said aligning means include at least one spring-loaded ball, said drum being formed with at least one axially extended recess, said ball being radially extended into said recess.

16. The device of claim 15, further including a longitudinal-feed control lever on said apron and means interconnecting said first mentioned control lever and said longitudinal feed control lever for preventing simultaneous actuating of said longitudinal-feed control lever with said first mentioned control lever for uncoupling the half-nuts.

17. The device of claim 16, wherein said preventing means include an elongated pin provided with two opposite tapered ends, said shaft being formed with a recess engageable with one tapered end of the elongated pin and said longitudinal-feed control lever being formed with a cavity engageable with another tapered end of said elongated pin, said one tapered end being out of register with said recess when said another tapered end is in register with said cavity.

18. The device of claim 17, wherein said limiting pin is axially adjustable in said threaded hole in said drum.

19. The device of claim 1, wherein said first spring means is a helical spring mounted in said cartridge against the opposite end of said pin.

* * * * *